Inventor
C. S. COCKERELL
By Cameron, Kerkam & Sutton
Attorneys

Inventor
C. S. COCKERELL
By Cameron, Kerkam & Sutton
Attorneys

Inventor
C. S. COCKERELL
By Cameron, Kerkam & Sutton
Attorneys

March 9, 1965 C. S. COCKERELL 3,172,494

SKIRTS OF FLEXIBLE FILAMENTORY MEMBERS FOR GROUND EFFECT MACHINES

Filed April 13, 1961 5 Sheets-Sheet 4

Inventor
C. S. COCKERELL
By Cameron, Kerkam & Sutton
Attorneys

March 9, 1965 C. S. COCKERELL 3,172,494

SKIRTS OF FLEXIBLE FILAMENTORY MEMBERS FOR GROUND EFFECT MACHINES

Filed April 13, 1961 5 Sheets-Sheet 5

Inventor
C. S. COCKERELL
By Cameron, Kerkam & Sutton
Attorneys 3,172,494
Patented Mar. 9, 1965

3,172,494

SKIRTS OF FLEXIBLE FILAMENTARY MEMBERS FOR GROUND EFFECT MACHINES

Christopher Sydney Cockerell, Waterford Lane, Lymington, England, assignor to Hovercraft Development Limited, London, England, a British company Filed Apr. 13, 1961, Ser. No. 102,877
19 Claims. (Cl. 180—7)

This invention relates to the supporting and moving of vehicles and heavy loads over a surface, the vehicle or load being at least partly supported above the surface by a cushion of pressurised gas formed and contained beneath the vehicle or load.

It has been proposed, for vehicles, to contain the cushion by a continuous downward projecting member positioned around the periphery of the bottom of the vehicle. In operation, after the cushion has been formed, excess gas escapes beneath the bottom edge of the downward projecting member. The clearance between the bottom edge of this member and the surface is a limiting factor as to the size of obstacles over which the vehicle will pass without contact. The larger this clearance is made the greater the amount of gas required to maintain it. It has been proposed to ease to some extent the difficulty of providing sufficient clearance without having an excessive and uneconomic air supply by making at least the lower portion of the downward projecting member flexible. By this means the actual clearance can be reduced and thus the gas flow through the clearance also reduced, while if the bottom of the downward projecting member comes into contact with an obstacle it can deflect upwards and pass over it.

However, even with the lower portion of, or all of, the downward projecting member being made flexible there is liable to be damage to the flexible portion, as although it is comparatively easy for the front of the flexible portion to deflect inwards and upwards over an obstacle it is not so easy for the rear to do so as it must be capable of stretching. Also there is a tendency for the whole flexible portion to be pulled rearwards which causes a relative displacement of the centre of pressure of the cushion, leading to instability. Also, when the vehicle is travelling at reasonable speeds, contact with sharp obstacles, such as rocks, is liable to tear the flexible portion, allowing escape of the pressurised cushion gas, and in large vehicles necessitating the repair or replacement of a large and expensive component.

The difficulties associated with a flexible member as described above can be considerably eased by making at least the lower portion of the cushion containing structure in the form of a number of closely spaced individual members. According to the invention there is provided a vehicle or other load carrying device, movable over a surface, which is at least partly supported above that surface by a cushion of pressurised gas formed and contained beneath the bottom of the vehicle, in which the cushion of pressurised gas is, at least partly contained around at least part of its periphery by means of a series of closely spaced filamentary members, projecting in a downward direction from the bottom of the vehicle or other load carrying device and susceptible of deflection over at least part of their length.

Preferably the members extend all round the periphery of the bottom of the vehicle or load carrying device and are flexible and/or flexibly attached to the bottom of the vehicle, or load carrying device and are arranged in a succession of rows enclosing the area of the cushion and arranged one within the other.

The invention is also applicable to vehicles and other load carrying devices of the type described in which the cushion or cushions is or are formed and maintained by at least one curtain of fluid ejected from a port or series of ports in the bottom of the vehicle. The pressure of the cushion or cushions, which can be maintained beneath the vehicle is dependent upon the stiffness of the fluid curtain. The effective stiffness of the curtain can be enhanced by the positioning of one or more rows of closely spaced members adjacent to the curtain, on the side of the curtain opposite to that of the cushion which the curtain is containing. Alternatively, where more than one curtain is normally provided, such as when it is desired to compartment the cushion, such as is described in the specification of co-pending patent application Serial No. 16,677, filed March 22, 1960, then at least part of at least one curtain can be replaced with a series of individual downwardly projecting filamentary members. According to a further feature of the invention therefore there is provided a vehicle or other load carrying device, of the type described in which the cushion or cushions of pressurised gas is, or are, partially or wholly contained for at least part of the periphery by one or more fluid curtains in combination with one or more series of closely spaced flexibly attached filamentary members projecting in downward direction from the bottom of the vehicle.

The members may be in the form of single rods, strands or wires, or may be fabricated as cords, ropes or chains, but are of filamentary form, that is to say are of compact cross-section and of considerable length in relation to their cross-sectional dimensions. They may be made susceptible of deflection over at least a part of their length by being made of flexible material or of a flexible construction, as for example a chain, or by virtue of their being hingedly attached to the under-side of the vehicle.

The pressure of the fluid cushion acts not only over that area contained wholly within the downward projecting members, but also over that area occupied by the members, the pressure over this latter area varying from the cushion pressure at the innermost position, adjacent to the cushion, to the atmospheric, or other pressure, which occurs outside the flexible members.

If the effective area occupied by the members can be locally varied, for example increased, then an additional lifting force will be produced at this point, a reduction in area causing a reduced lifting force. Such local variation of area occupied by the members, can be used for providing stability.

Normally, the cushion is of air, and where fluid curtains are formed these also are of air. Other gases such as exhaust gases and steam can also be used, and, where convenient, such as when operating over water, the fluid curtains can be of water. For convenience, hereinafter, the cushion, and where provided, the curtains, are considered as being formed of air.

The invention will be readily understood by the following description of certain embodiments in conjunction with the accompanying drawings in which:

FIGURE 4 is a fragmentary cross-section on the line A—A of FIGURE 2 to an enlarged scale illustrating the downward projecting members.

FIGURES 5, 6 and 7 are similar cross-sections to

Figures 4, 5, 6, 7, 8, 9, 10:
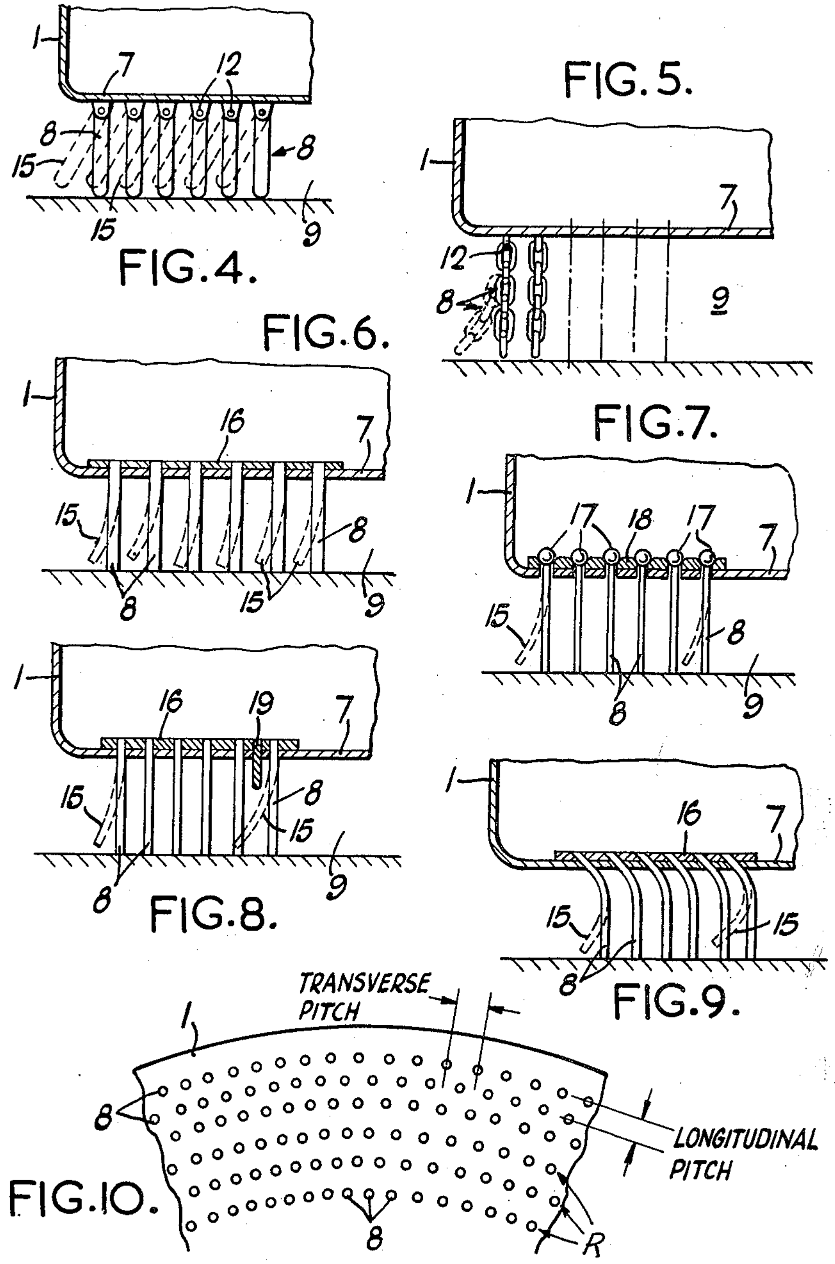

FIGURE 4 illustrating alternative forms of the downward projecting members.

FIGURE 8 is a cross-section similar to FIGURE 6 illustrating a modification thereof.

FIGURE 9 is a similar cross-section to FIGURE 6 illustrating a modified method of attaching the downward projecting members.

FIGURE 10 is a fragmentary inverted plan view of part of the periphery of a vehicle, to an enlarged scale, illustrating one particular disposition of the downward projecting members.

Figure 11:
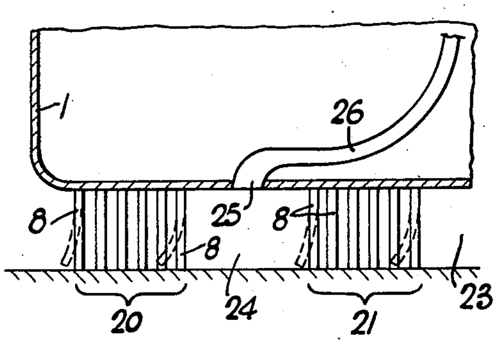

FIGURE 11 is a fragmentary cross-section similar to that of FIGURE 4 illustrating the provision of two sets of downward projecting members for the formation of a secondary air cushion.

Figure 12:
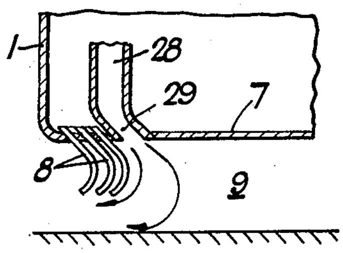
Figure 13:
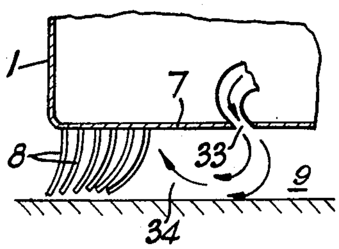
Figure 14:
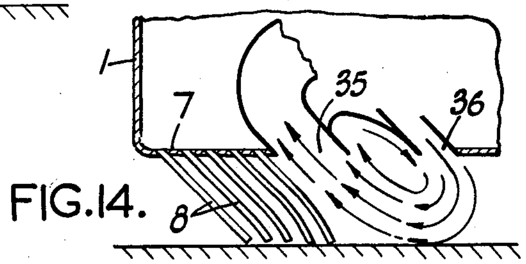

FIGURES 12 to 14 are fragmentary cross-sections similar to that of FIGURE 4 illustrating various applications of downward projecting members in conjunction with a fluid curtain.

Figure 15:
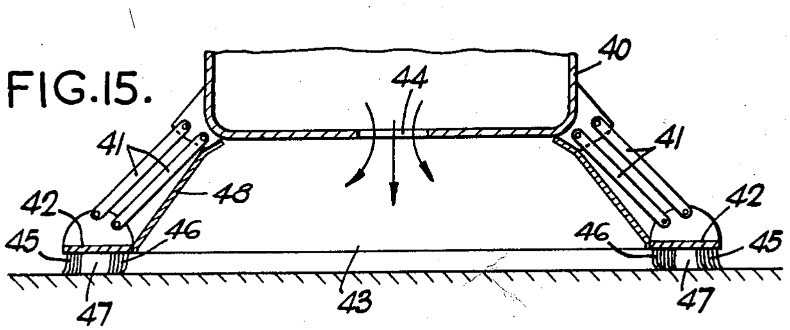

FIGURE 15 is a vertical cross-section through the bottom portion of a vehicle illustrating the use of downward projecting members in conjunction with flexibly attached cushion containing means.

Figure 16:
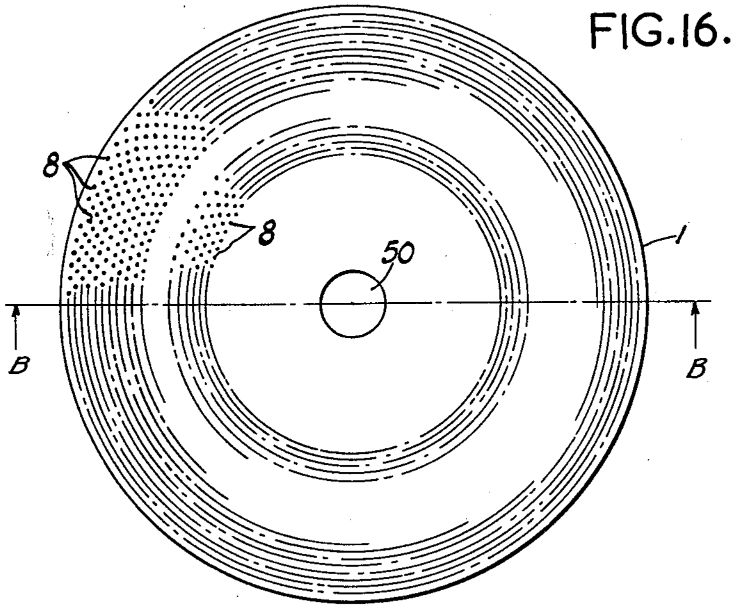
Figure 17:
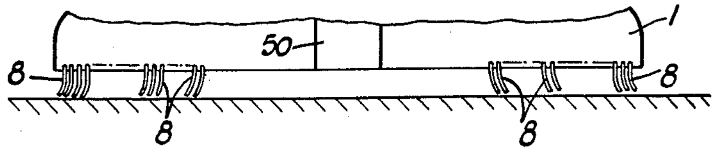

FIGURE 16 is an inverted plan view of a heavy load carrying device in which a cushion pressure substantially in excess of that normally used for vehicles is required FIGURE 17 is a vertical cross-section of the bottom portion of the device illustrated in FIGURE 16, on the line B—B of FIGURE 16.

Figure 18:
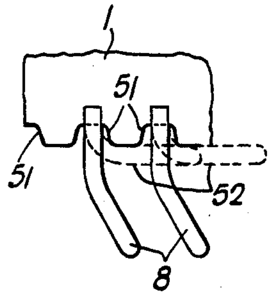

FIGURE 18 is a part of FIGURE 17 to an enlarged scale, showing a method of mounting the downward projecting members.

FIGURES 19 to 23 illustrate the use of downward projecting members of varying length to provide stabilising means.

Figures 19, 20, 21, 22, 23, 24, 25:
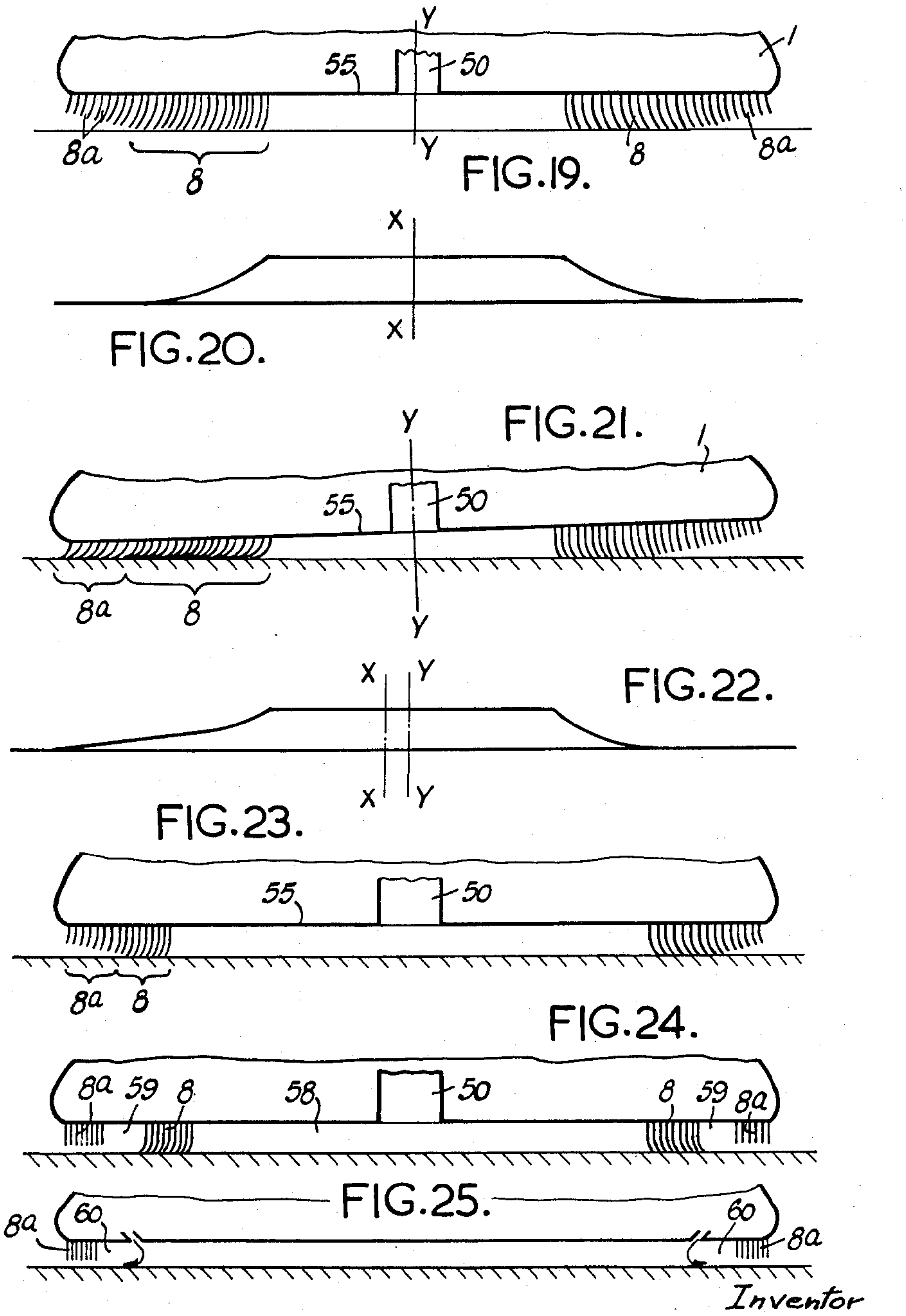

FIGURE 24 illustrates a further method of providing stabilising means, and

FIGURE 25 illustrates the use of downward projecting members in conjunction with a fluid curtain to provide stabilising means.

Figure 1:
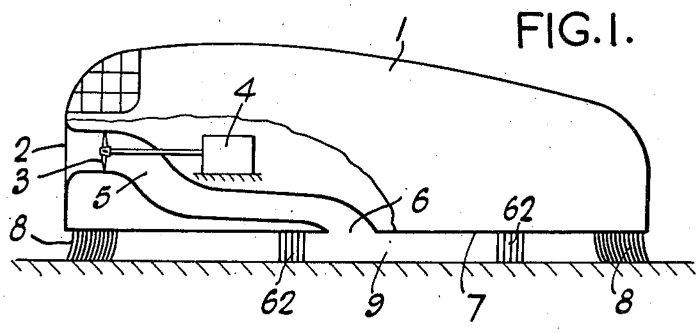
FIGURE 1 is a side elevation of a vehicle embodying the invention, part of the side of the vehicle being omitted to show the air supply for the cushion.
Figure 2:
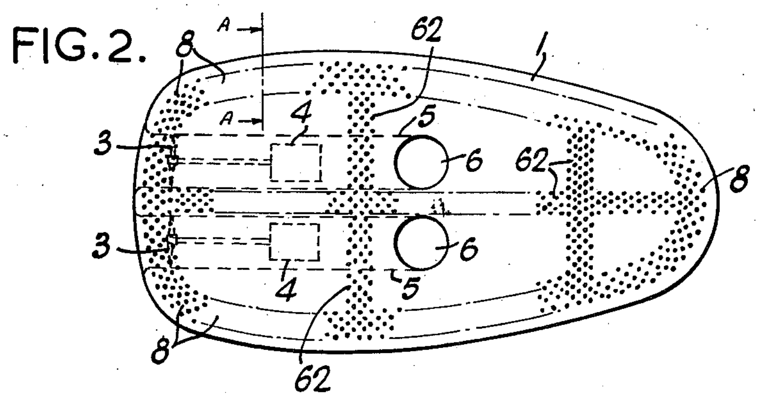
FIGURE 2 is an inverted plan view of the vehicle illustrated in FIGURE 1.
Figure 3:
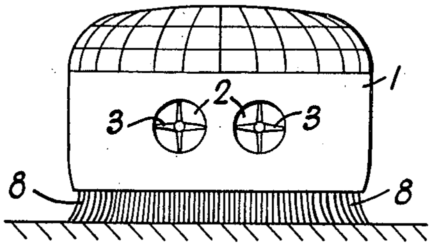
FIGURE 3 is a front view of the vehicle illustrated in FIGURE 1.

The vehicle illustrated in FIGURES 1, 2 and 3 comprises a main body portion 1, having air intakes 2 at the front through which is drawn air by the propellers 3, which are driven by engines 4. The propellers 3 are situated in ducts 5, the forward ends of which form the intakes. The rear ends of the ducts connect with two ports 6 formed in the bottom surface 7 of the vehicle. Positioned round the periphery of the bottom of the vehicle are several rows of downward projecting members 8, the form and disposition of which are more fully described below.

In operation, air is drawn in through the intakes 2 by the propellers 3, the air passing through the ducts 5 and issuing from the ports 6. A cushion of pressurised air is built up beneath the vehicle, the cushion being contained round its periphery by the downward projecting members 8. Air will, of course, escape between the members 8, but this flow is restricted. The vehicle is thus supported by a cushion of air 9.

FIGURE 4 illustrates one particular form of downward projecting members. The downward projecting members 8 are in the form of rigid rods or the like, hinged at their top ends 12 to the bottom surface 7 of the vehicle. The members are positioned in a number of rings or rows R round the periphery of the bottom of the vehicle, the members being closely spaced in the rings, as indicated in FIGURE 10. The members, under the action of the pressure of the cushion, swing outwards to a position such as that indicated by dotted lines 15, dependent on the pressure of the cushion and the weight of the individual members. Some fluid will escape beneath the members, whilst further fluid will escape between the members.

Instead of being rigid the members may be flexible, either by being made of material which is flexible or of short rigid sections hinged together. FIGURES 5, 6 and 7 illustrate some examples of such manufacture. In FIGURE 5 the members 8 are made from short lengths of chain pivotally connected at 12 to the bottom surface 7 of the vehicle. FIGURE 6 shows the members 8 made of lengths of steel, or other material, wire rope. In this example the members are rigidly held at the top in a structural member 16 attached to the bottom 7 of the vehicle. The lengths of wire rope may be covered with a layer of material such as plastic which would protect the wire rope from erosion and corrosion, except at the bottom of the members, and would allow the members to hit against one another without damage and undesirable noise. Instead of the members being rigidly fixed in the structural member 16 they can be held in spherical or other types of mountings. This is illustrated in FIGURE 7, where the members 8 are of lengths of flexible tube such as rubber tube. The tops of the members are fixed in spherical members 17 which rest in suitable spherical seats formed in a structural member 18. The members 8 pass through the structural member 18 by means of holes which are larger than the members 8 to allow for movement of the spherical members 17 in their seats.

Where the members 8 are fastened rigidly at their top ends to the bottom of the vehicle, as in FIGURE 6, there will be a short length of each member, at the top end, which will not be able to deflect or will deflect only slightly. This length of the member will not be deflected by an obstacle and therefore the lengths of the members must be such that all obstacles which are likely to be encountered will be passed over without hitting these top lengths of the members. Apart from acting as an attachment and a hinge for the rest of the member, this part of each member is therefore not assisting in any way, whilst air is flowing out from the cushion to the surrounding space through the spaces between the members. If these spaces are closed to the passage of air by means which do not interfere with the deflection of the members, an increase in efficiency is obtained. One method is illustrated in FIGURE 8 which is a similar view to that of FIGURE 6. The members 8 are of wire rope or the like rigidly fixed in the structural member 16. Positioned between the two innermost rings of members 8 is a strip-like member 19. The member 19 extends between the two inner rows for the full length of the arrangement of the rows of the downwardly directed members, that is, for the whole periphery of the vehicle where the members 8 are right round the periphery, or for that part, or those parts, of the periphery to which the members 8 are applied. The strip-like member 19 may be of rigid construction or of flexible construction, and the amount by which it projects downwards from the bottom of the vehicle corresponds approximately to the length of the members 8 which does not deflect or deflects only slightly. If desired, the members 8 may be fixed to the bottom surface 7 of the vehicle with an inward inclination as shown in FIGURE 9. This method of fixing will provide an initial increase in stiffness against the cushion pressure.

FIGURE 10 is an inverted plan view of a part of the bottom of a vehicle embodying the invention. The downward projecting members are indicated at 8 and this figure is generally applicable to all the forms of downward projecting members. As described below the resistance to flow of air between the members 8 depends upon the spacing of the members. For convenience the distance between adjacent members in a direction parallel to the periphery of the vehicle is called the transverse pitch and the distance between adjacent members in a direction normal to the transverse pitch is called the longitudinal pitch. The dimensions of the pitches are readily represented as functions of the diameter of each of the members 8 which is hereinafter called $d$. Generally the members 8 are in a series of parallel rows around the periphery of the bottom of the vehicle, the members in adjacent rows being staggered as shown. In such an arrangement the transverse pitch is the distance between the centres of adjacent members in a row and the longitudinal pitch is the distance between the centre lines of adjacent rows.

It has been found that the transverse pitch has the greatest effect on the resistance to flow of air from the higher pressure side of the series of members to the lower pressure side. The smaller the transverse pitch the higher the resistance to the flow of air. There is however a minimum pitch below which there is a tendency for the individual members to interfere with one another. The interference between the members also prevents them readily deflecting when contacting an obstruction and damage is more likely to occur. Transverse pitches of the order of 3/2 $d$ have been found to give good results.

If longitudinal pitch is plotted against resistance to flow, it is found that at a very small longitudinal pitch there is an initial high resistance which falls off rapidly as the pitch increases, the resistance being very low at pitches between approximately $1d$ and $2d$. The resistance then increases up to longitudinal pitches of the order of $3d$ when the resistance levels off at an approximately constant value. This is thought to be because a longitudinal pitch of approximately $3d$ provides sufficient distance for the maximum expansion of the air after passing through the restriction bounded by two members. If the very small pitches, which gave the initial high resistance values described above, are used again there is a tendency for interference between adjacent members and increased possibility of damage. For both transverse and longitudinal pitch, the increased weight due to positioning the members very close together, apart from the difficulties mentioned above, does not provide a commensurate decrease in flow and eventually becomes uneconomic.

The number of rows provided depends upon the efficiency required and may be varied within very wide limits.

Where the downward projecting members rely on their weight to resist the pressure of the cushion, such as when the members are in the form of hinged rods or chains or doors, the total weight required for the members can be obtained from the equation:

$$w=2.pc.h.l$$

when the centre of gravity of the members is at the mid point of the member, that is, normally, half way down the length of each member. When the centre of gravity is at the bottom of the member then the weight can be obtained from the equation:

$$w=pc.h.l$$

When the downward projecting members rely on their stiffness to resist the cushion pressure, the total stiffness required can be calculated from the equation:

$$\text{bending moment}=\frac{pc.h^2.1}{2}$$

In the above equations $w$=total weight of members, $pc$=cushion pressure, $h$=height of seal which is vertical length of members, and $l$ is the peripheral length covered by the members.

The equations assume that all the cushion pressure is taken on the members, but this may not be the case. The proportion of the pressure taken by the members may in some cases be only 80%.

FIGURE 11 illustrates the application of the invention to a vehicle in which the cushion is compartmented into a main cushion and a surrounding secondary cushion, for example as decribed in the aforementioned application Serial No. 16,677. An outer series 20 of downward directed members 8 is positioned adjacent to the periphery of the vehicle and an inner series 21 of similar members 8 is positioned inboard of and spaced from the outer series 20. A main cushion of pressurized fluid is formed in the space 23 inside the inner series 21 of the members 8, as described above in relation to FIGURES 1 to 3. Fluid will flow under the inner series of members 8 and through the spaces between them and form a further or secondary cushion of pressurized fluid in the space 24 between the two series of members 8. The fluid from the space 23 will flow under the outer series of members and through the spaces between them to the surrounding atmosphere. The pressure of the secondary cushion in the space 24 between the two series of members, will be intermediate between that of the main cushion in the space 23 inside the inner series 21 and atmosphere.

As described in the above mentioned application, such an arrangement will provide stabilising means. However as the air flow into the space 24 is only from the main cushion formed in the space 23 inside the inner series 21 a local variation in height at the periphery of the vehicle is only likely to cause a short-term local increase in pressure in the space 24. It is therefore desirable to make provision for the injection of pressurised air into the space 24 directly at a plurality of positions around the vehicle such as by ports 25 fed by ducts 26. The ducts 26 connect with the duct 5, as FIG. 1, but the flow through the ports 25 is regulated to provide a cushion pressure in the space 24 intermediate that pressure in the space 23 and atmosphere, during normal operation of the vehicle. This will provide long-term local pressure increases on the occurrence of local decreases in height of the periphery of the vehicle. If one of the series of members is in combination with an air curtain as described below and shown in FIGURE 12 or FIGURE 13 then the desirable long-term stability requirements are provided. Where inner and outer curtain systems are normally provided it is preferable to replace the outer curtain by a series of downward projecting members.

As stated above the downwardly directed members may be used in conjunction with fluid curtains. FIGURE 12 illustrates one example of such a combination. Fluid from a suitable source, not shown, is fed via a duct 28 to a supply port 29 formed in the bottom of the vehicle. The port 29 may be annular or part annular or a series of ports arranged in an annular or part annular configuration. When in operation, the fluid is ejected from the port 29 in the form of a curtain which forms and retains or assists in forming and retaining, a cushion of pressurised fluid beneath the vehicle. The pressure of the cushion deflects the curtain outwards as shown, and the pressure of the cushion which the curtain can contain is a function, at least to some extent, of the stiffness of the curtain. The strength or stiffness of the curtain can be increased without increasing the mass flow of the fluid forming the curtain by positioning one or more rows of downward projecting members 8 adjacent to the outside of the curtain. The members are attached to the bottom surface of the vehicle with an initial inward inclination as shown.

An alternative arrangement in which a fluid curtain and a series of individual downward projecting members are used in combination is illustrated in FIGURE 13. In this arrangement, a series of downward projecting members 8 is arranged adjacent to the periphery of the bottom of the vehicle, and a fluid curtain is formed by fluid ejected from a port 33 spaced from and inboard of the downward projecting members 8. In operation a main cushion 9 is formed and maintained within the fluid curtain formed from the port 33, the pressure of the cushion deflecting the curtain outwards as shown. A further or secondary cushion of pressurised fluid is formed in the space 34 between the series of members 8 and the curtain formed from the port 33. The fluid forming this secondary cushion escapes under and between the members 8, the pressure of this cushion being intermediate between that of the main cushion inside the curtain and atmosphere. The positions of the port 33 and the members 8 can be reversed so that the fluid curtain is adjacent to the periphery of the bottom of the vehicle and the members 8 are inboard of and spaced from the curtain. The curtain may also be reinforced by one or more rows of downwardly directed members on the outside. In the examples illustrated in FIGURES 12 and 13, the air for forming the curtain can be supplied by the propellers 3, FIGURE 1.

One or more series of flexible members can be used in combination with one or more air curtains to provide a curtain system in which at least part of the air forming the curtain, or curtains, is recovered for further use. An example of such a system is illustrated in FIGURE 14. Adjacent to the periphery of the vehicle is a series of downward projecting members 8, the members being attached to the bottom surface 7 of the vehicle so that they also project inwards towards the center of the vehicle. Immediately inside the series of members is a recovery port 35, which is annular in form and substantially parallel to the periphery of the vehicle. Space inwardly from the recovery port and substantially parallel thereto is an annular supply port 36. In operation air is expelled from the supply port downwards towards the surface over which the vehicle is operating and inwards towards the centre of the vehicle, to form a curtain of air. The curtain is deflected round and outwards by the pressure of the cushion formed beneath the vehicle and the air forming the curtain is then deflected upwards into the recovery port. The members 8 assist in the deflection of the curtain forming air into the recovery port.

FIGURE 15 illustrates the application of the invention to a vehicle of the type shown in co-pending application Serial No. 837,502, filed September 1, 1959, in which at least part of the structure which contains the cushion is attached to the main body of the vehicle in a flexible manner so that it can move up or down as the vehicle moves over uneven surfaces. The vehicle comprises a main body 40 from which depend a series of articulated members 41 which support an annular member 42. The inner parts of the articulated members are connected by a fluid-tight flexible membrane or similar fluid tight envelope 48, a cushion of pressurised fluid being buit up in the space 43 beneath the vehicle, within the membrane or envelope, by means of fluid ejected through a port 44 in the bottom of the main body of the vehicle. Attached to the bottom surface of the annular member 42 are two series of downward projecting members 45 and 46. The two series of members are in two annular formations, having an annular space 47 between them. Fluid from the main cushion in the space 43, escapes below and between the downward projecting members of the inner series 46 into the space 47, where a secondary cushion of pressurised fluid is formed. The fluid from the secondary cushion escapes below and between the downward projecting members of the outer series 45, the pressure of the secondary cushion being intermediate between that of the main cushion and atmosphere. Again in such a vehicle, fluid curtains may also be provided being combined in various ways with one or more series of downward projecting members.

A further application of the invention is supporting and moving heavy loads over a surface. Where such heavy loads are to be moved considerable difficulties can arise, due to the concentrated load effects, when wheels or the like are used. The concentration of the load can be reduced to some extent by providing a multiplicity of wheels, when sufficient space is available, but where the total load is acting over a relatively limited area, there is a limit to the number of wheels or other similar supporting members which can be provided.

FIGURES 16 and 17 illustrate the invention applied to a load carrying member 1 for movably supporting very heavy concentrated loads. It is circular in plan form, and has a large number of downward projecting members 8 arranged in a series of circles. The arrangement and disposition of the members 8 is as described above. Air at a predetermined pressure is admitted into the space within the circles of members through a supply port 50. The weight supported is a function of the pressure of the air supply through the supply port 50 and the number of circles of downward projecting members.

The flexible members may be either rigidly attached to the bottom surface of the load carrying member or may be attached by means of spherical or similar seatings as described above. The pressure of the cushion within the circles of downward projecting members 8, which is the pressure of the air supply, acts on the bottom of the load carrying member over the entire area within the innermost circle of members, whilst a pressure which decreases from the innermost circle to the outermost circle of the downward projecting members, acts on the bottom of the load carrying member over the area occupied by the members 8. The total load carried is approximately equal to the cushion pressure times the area within the members 8, plus the mean pressure acting over the area occupied by the members 8 times this area (less of course the area of the flexible members themselves).

When the supply of air is cut off, the load carrying member will settle down on to the surface over which it had been supported. When the surface is soft, then no damage is likely to occur to the flexible members. With harder surfaces, the flexible members will be trapped between the bottom of the load carrying member and the surface. It is necessary therefore that the flexible members are so made that they are undamaged under such conditions. It is preferable that the flexible members are attached so that their attachment points are protected. One such method is illustrated in FIGURE 18. The downward projecting members 8 are mounted in concentric grooves 51 in the bottom of the load carrying member 1, the flexible members being deflected as indicated at 52, when the load carrying member is at rest on a surface. Alternatively, or in addition, the bottom surface of the load carrying member may be of flexible construction, e.g. rubber, to protect or further protect the members 8.

The pressure of the fluid cushion acts not only over that area contained wholly within the downward projecting members, but also over that area occupied by the members, the pressure over this latter area varying from the cushion pressure at the innermost position, adjacent to the cushion, to the atmospheric, or other pressure, which occurs outside the flexible members.

If for any reason, one part of the vehicle or load carrying member approaches more closely the surface above which it is supported, the downward projecting members at that locality will act more efficiently at the reduced height, and the radial pressure gradient across the width of the flexible members will be steeper tending to create a restoring force. This restoring force is, however, quite small and generally is not sufficient to stabilise the vehicle effectively. If the effective area occupied by the members can be locally varied, for example increased, then an additional lifting force will be produced at this point, a reduction in area causing a reduced lifting force. Such local variation of area occupied by the members, can be used for providing stability. FIGURE 19 illustrates the application of downward projecting members in which the outer members are shorter than the inner members. A large number of members 8, arranged in a series of circles as described above, are attached to the bottom surface 55 of a load carrying member. Outside the downward projecting members 8, which are all substantially of the same length, are attached further downward projecting members 8*a*, the lengths of which decrease successively from the innermost circle to the outermost circle, as shown.

In normal operation, the load carrying member is parallel to the surface, as shown in FIGURE 19, only the members 8 effectively acting as a seal. The pressure distribution over the bottom of the vehicle is somewhat as shown in FIGURE 20, the centre of pressure X—X coinciding with the centre of gravity Y—Y of the vehicle. If the load carrying member tilts, however, as shown in FIGURE 21, then the members 8*a* at that part of the member which approaches closer to the surface, also act as part of the seal. The pressure distribution over the bottom of the member is then somewhat as shown in FIGURE 22. The centre of pressure X—X moves over towards that part of the member which is closer to the surface, away from the centre of gravity Y—Y of the vehicle, and a restoring force is created.

The application of downward projecting members of varying length can also be made to vehicles. Normally, the cushion pressure of vehicles is low as the weight is carried over a large area, and the number of rows of downward projecting members is thus less. An example of a vehicle with members of varying length is shown in FIGURE 23, members 8 being of constant length and members 8*a* varying in length as shown. The arrangement is not so effective as that shown in FIGURE 19, as the movement of the centre of pressure is much less. FIGURE 24 illustrates an alternative arrangement which gives an enhanced result. The outer series of downward projecting members 8*a* is spaced from the inner series of downward projecting members 8, the outer series being shorter than the inner series. In normal operation, the members 8 act as the seal and contain the cushion 58. When the vehicle tilts, the additional shorter members 8*a* come in contact with the surface and a subsidiary cushion is formed in the space 59 between the two sets of members 8 and 8*a*.

The provision of downward projecting members for providing improved stability may also be made to vehicles in which the cushion is formed and contained by a curtain of fluid, generally air. Such an example is shown in FIGURE 25. The effect of the members 8*a* is the same as in the vehicle shown in FIGURE 24, a subsidiary cushion being formed in the space 60.

To increase the effect of the pressure rise which occurs in the spaces 59 and 60, and to make the effect more local, rows of downward projecting members may be provided to subdivide the subsidiary cushion space. The main cushion, which underlies the major, central portion of the area of the vehicle body within the surrounding rows of members 8, may also be subdivided, or compartmented, into a plurality of cushion spaces containing air at different pressures by further rows of downward projecting members, as indicate at 62 in FIGURE 2.

A vehicle or the like may also be supported by a number of cushions contained around their peripheries as described above. Each such cushion is a separate entity and may be provided with any, or a combination, of the methods described for improving stability.

I claim:

1. A vehicle or other load carrying device, movable over a surface, having a body which is at least partly supported above that surface by a cushion of pressurised gas formed and contained beneath the bottom of said body, in which the cushion of pressurised gas is at least partly contained around at least part of its periphery by a series of individually mounted flexible members projecting in a downward direction from the bottom of said body and capable of deflection relative to said body over at least part of their length, said members having a predetermined spaced apart relationship such as to permit a restricted flow of gas outward from said cushion toward the atmosphere through the spaces between said members, whereby the pressure of said gas acts on that portion of the bottom of said body from which said members project as well as the portion contained within said members.

2. A vehicle or other load carrying device as claimed in claim 1 in which the members are arranged in a succession of rows enclosing the area of the cushion and arranged one within the other.

3. A vehicle or other load carrying device as claimed in claim 2 including at least one further series of downward projecting members spaced from and arranged in rows substantially parallel to the rows of said first-named series of downward projecting members, the gas which flows outward from said cushion through the spaces between the members of said first-named series forming a subsidiary cushion of pressurised gas in the space between said first-named and said further series of downward projecting members.

4. A vehicle or other load carrying device as claimed in claim 3 including means for supplying additional pressurized gas to the space between said first-named and said further series of downward projecting members.

5. A vehicle or other load carrying device as claimed in claim 1 in which another series of downward projecting members of varying length is positioned outboard of the said first-named series of projecting members, the length of the downward projecting members forming the said other series varying from the longest forming the innermost member to the shortest forming the outermost member.

6. A vehicle or other load carrying device as claimed in claim 1 in which the space within said series of downward projecting members occupied by the gaseous cushion when formed is subdivided by at least one further series of downward projecting members.

7. A vehicle or other load carrying device as claimed in claim 1 including means for forming a fluid curtain which flows downward from the vehicle body and cooperates with said series of downward projecting members to at least partly contain the cushion of pressurised gas for at least part of its periphery.

8. A vehicle or other load carrying device as claimed in claim 7 in which said downward projecting members are spaced from and arranged in rows parallel to the fluid curtain, and a subsidiary cushion is formed in the space between the downward projecting members and the fluid curtain.

9. A vehicle or other load carrying device as claimed in claim 7 in which another series of downward projecting members is positioned outboard of the said first-named series of projecting members and said fluid curtain.

10. A vehicle or other load carrying device as claimed in claim 7 in which the space within said series of downward projecting members occupied by the gaseous cushion when formed is subdivided by at least one further series of downward projecting members.

11. A vehicle or other load carrying device, movable over a surface, having a body which is at least partly supported above that surface by a cushion of pressurised gas formed and contained beneath the bottom of the vehicle, in which the cushion of pressurised gas is at least partly contained around at least part of its periphery by means of a series of individually mounted flexible members, projecting in a downward direction from the bottom of said body and susceptible of deflection over at least part of their length, the said members having a predetermined spaced apart relationship such as to permit a restricted flow of gas outward from said cushion toward the atmosphere through the spaces between said members, said members being arranged in a plurality of parallel rows enclosing the area of the cushion and arranged one within the other, the members in adjacent rows being staggered with respect to one another.

12. A vehicle or other load carrying device as claimed in claim 11 in which the distance between the centres of adjacent members in each row is of the order of $3/2d$, where $d$ is the diameter of each of said members.

13. A vehicle or other load carrying device, movable over a surface, having a body which is at least partly supported above that surface by a main cushion of a pressurised gas formed and contained beneath the bottom of the vehicle, in which the main cushion of pressurised gas is at least partly contained around at least part of its periphery by means of a series of individually mounted flexible members, projecting in a downward direction from said body and susceptible of deflection over at least part of their length, said members having a predetermined spaced apart relationship such as to permit a restricted flow of gas outward from said cushion through the spaces between said members, and which also includes at least one further series of downward projecting members spaced from and substantially parallel to the first-named series, and means for injecting pressurised gas into the space between the first-named series and the further series of downward projecting members to provide a subsidiary cushion of pressurised gas having a pressure intermediate the pressure of the main cushion and the pressure of the atmosphere.

14. A vehicle or other load carrying device, movable over a surface, having a body which is at least partly supported above that surface by a cushion of pressurised gas formed and contained beneath the bottom of the vehicle, in which the cushion of pressurised gas is at least partly contained around at least part of its periphery by means of a series of individually mounted flexible members, projecting in a downward direction from the bottom of said body and susceptible of deflection over at least part of their length, said members having a predetermined spaced apart relationship such as to permit a restricted flow of gas outward from said cushion toward the atmosphere through the spaces between said members, in combination with a fluid curtain which is positioned inboard of the said series of downward projecting members.

15. A vehicle or other load carrying device as claimed in claim 14 in which the downward projecting members are so attached to the bottom of said body that at least the upper ends thereof are inclined inwardly with respect to the cushion of pressurised gas.

16. A vehicle or other load carrying device as claimed in claim 14 in which at least part of the fluid forming the curtain is drawn back into said body through a recovery port positioned immediately inside the series of downward projecting members and is recirculated in the curtain through a supply port positioned inboard of the recovery port.

17. A vehicle or other load carrying device, movable over a surface, having a body which is at least partly supported above that surface by a cushion of pressurised gas formed and contained beneath the bottom of the vehicle, in which the cushion of pressurised gas is surrounded and contained by means of a plurality of concentric circular rows of individually mounted flexible members attached to and projecting in a downward direction from the bottom of said body, said members having a predetermined spaced apart relationship such as to permit a restricted flow of gas outward from said cushion toward the atmosphere through the spaces between said members.

18. A vehicle or other load carrying device as claimed in claim 17 in which the downward projecting members of the outer rows are shorter than the members of the inner rows.

19. A vehicle or other load carrying device as claimed in claim 18 in which the outer rows of shorter downward projecting members are separated from the inner rows of longer members by an air space which is normally open to the atmosphere beneath the bottom ends of the shorter members, but functions as a subsidiary cushion when said body tilts so as to bring the shorter members into contact with the surface.

References Cited by the Examiner

UNITED STATES PATENTS

| | | | |
|---|---|---|---|
| 2,743,787 | 5/56 | Seck | 180—7 X |
| 2,814,064 | 11/57 | Montgomery | 180—7 X |
| 3,055,446 | 9/62 | Vaughen | 180—7 |

FOREIGN PATENTS

| | | |
|---|---|---|
| 219,133 | 11/58 | Australia. |
| 1,238,499 | 7/60 | France. |
| 1,240,721 | 8/60 | France. |

OTHER REFERENCES

Publication: "Symposium on Ground Effect Phenomena"; Oct. 21–23, 1959; pages 387–389.

Publication: Science and Mechanics; June 1960; pages 73–77.

PHILIP ARNOLD, *Primary Examiner.*

A. HARRY LEVY, *Examiner.*